F. L. JOBSON.
ATTACHMENT TO WATER GAGES.
APPLICATION FILED DEC. 24, 1910.
1,007,703.
Patented Nov. 7, 1911.
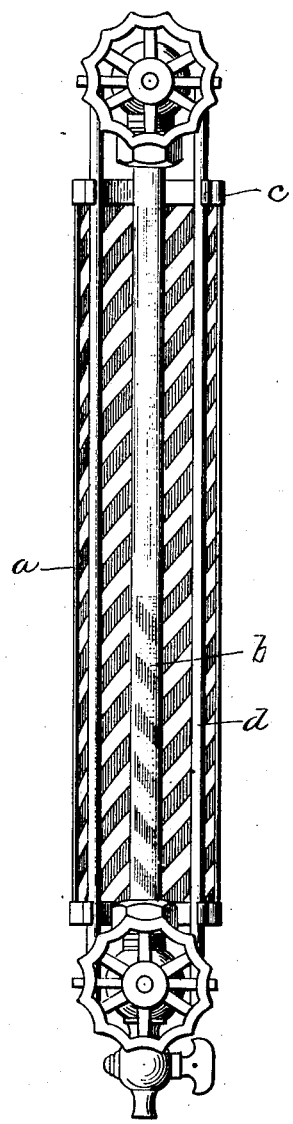
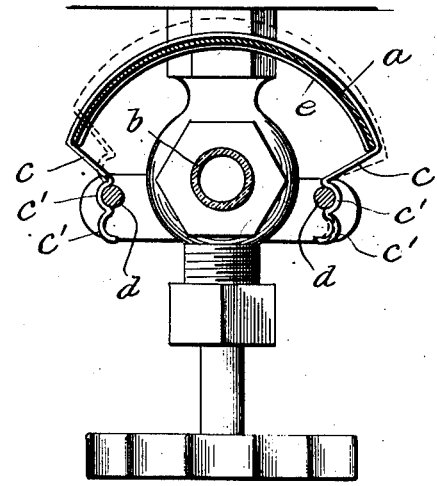
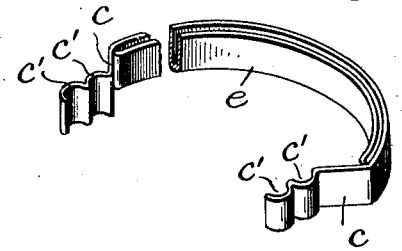
Inventor
Frank L Jobson

UNITED STATES PATENT OFFICE.

FRANK L. JOBSON, OF RICHMOND, VIRGINIA.

ATTACHMENT TO WATER-GAGES.

1,007,703.  Specification of Letters Patent.  Patented Nov. 7, 1911.

Application filed December 24, 1910. Serial No. 599,091.

*To all whom it may concern:*

Be it known that I, FRANK L. JOBSON, a citizen of the United States, and a resident of Richmond, county of Henrico, and State of Virginia, have invented certain new and useful Improvements in Attachments to Water-Gages, of which the following is a full and clear specification, reference being had to the accompanying drawings, in which—

Figure 1 is a front view of a water gage of well known construction provided with my attachment; Fig. 2 a transverse or horizontal sectional view, one of the positions of the gage attachment being shown in full lines and another of its positions being shown in dotted lines; Fig. 3 a perspective view, partly broken away of one of the edge clips carrying the spring arms.

The object of this invention is to provide a simple gage plate attachment to a gage which will indicate at a glance the level of water in the gage tube, as more fully hereinafter set forth.

In the drawing $a$ designates a suitable sheet metal plate of approximately the length of the glass tube $b$ of the gage and curved transversely throughout its length to give approximately semi-circular shape in cross section. On the face of this plate is painted or otherwise applied a series of bands of alternating contrasting colors, these bands being arranged close together and spirally upon the face of the plate. To form the above plate, it is obvious that it is simply necessary to cut a strip of sheet metal, paint or otherwise apply diagonal bands of contrasting colors thereon, and then bend up the plate, this bending action bringing the bands into spiral form. This gage plate is adapted to be supported behind the gage tube, and for this purpose I fasten to each corner of the plate a spring arm or finger $c$ which is bent inwardly and then outwardly, these outwardly extending parts being bent into a plurality of curved seats $c'$ which resiliently clasp the usual vertical rods $d$ of the gage structure and thus support the gage plate thereon. The resiliency of the arms enables the plate to be readily snapped onto or off the rods and also they adapt the plate to be adjustable to water gages having differently spaced rods. The object in providing each of the spring arms with more than one seat is to enable the device to be applied to gages whose vertical rods stand at different points with reference to the glass tube, whereby the gage plate may be supported at a proper distance from the glass tube when applied to gages of various makes and sizes. This plurality of seats also permits the gage plate to be rotatively adjusted, as shown in dotted lines in Fig. 2, so that when the gage is in such position that it would be inconvenient to have the gage plate centrally back of the gage structure, it may be set to one side of the center, as shown in said Fig. 2.

The spring fingers are preferably formed integral with the semi-circular sheet metal bands $e$ which are folded and clamped upon the respective upper and lower ends of the gage plate, thus serving not only as a means of attachment of the springs arms of the plate but also as a means of bracing the plate and assisting in holding its proper curvature. These bands or clips $e$ consist of strips of sheet metal bent or folded upon themselves longitudinally, the flanges thus formed being clamped over the ends of the plate. One or both these marginal stiffening clamps is made removable from the plate, so that upon removal from the plate the plate may be cut off at any point to shorten it sufficiently to adapt it for use on a shorter gage tube.

By curving the plate and extending the contrasting bands entirely across its face, it will be observed that the gage may be read from points of view considerably to each side of a point directly in front of the gage, and this it is clear is an important advantage in the matter of convenience.

When the glass tube contains no water, it is practically opaque since the hollow glass cylinder deflects and breaks up the light rays sufficiently to prevent the contrasting bands being seen distinctly. As soon however as the water passes up into the tube, the tube becomes practically a solid transparent cylinder thus permitting the passage of the light rays through it. But in accordance with a well known law of optics, the portions of the bands which are seen through the water filled portion of the tube are so deflected and distorted that they appear to the eye to incline in a direction opposite to the portions of the bands seen at opposite sides of the tubes. This distortion of the bands at a point between their ends, provides an exceedingly distinct and characteristic mark to show at a glance the height of the water in the tube. Experiment has shown that this means provides such a distinct indication that the gage may be read distinctly and at a glance even when located in the darkest and most obscure place in the boiler room.

Having thus described my invention, what I claim as new and desire to secure by Letters Patent, is—

1. An attachment for a water gage, consisting of a transversely curved plate and means for attaching it to the gage behind the glass tube thereof, said plate being provided on its face with a series of bands of contrasting color spirally arranged on the plate and extending to points beyond the sides of the tube.

2. An attachment for glass tube water gages consisting of a curved plate provided on its face with bands of contrasting colors and provided at each of its corners with a spring finger provided with a seat, said spring finger being adapted to clasp the vertical rods of the gage structure.

3. An attachment for glass tube water gages consisting of a curved plate provided on its face with bands of contrasting colors and provided at each of its corners with a spring finger provided with a plurality of seats, said spring finger being adapted to clasp the vertical rods of the gage structure.

4. An attachment for glass water tube gages consisting of a plate provided on its face with indicating lines extending across the plate to points beyond the side edges of the glass tube, said plate being transversely curved, and means for attaching the plate to the gage structure.

5. An attachment for a glass tube water gage consisting of a plate and means for attaching it behind the glass tube, said plate having on its face a series of bands of contrasting color extending diagonally across the plate to points beyond the sides of the tube, for the purpose set forth.

In testimony whereof I hereunto affix my signature in the presence of two witnesses this 20 day of Dec. 1910.

FRANK L. JOBSON.

Witnesses:
Geo. Ainslie,
R. A. Burnett.